United States Patent [19]

Mink et al.

[11] Patent Number: 5,330,951
[45] Date of Patent: Jul. 19, 1994

[54] CATALYST COMPOSITION FOR POLYMERIZING ALPHA-OLEFIN

[75] Inventors: Robert I. Mink, Warren; Thomas E. Nowlin, Cranbury, both of N.J.

[73] Assignee: Mobil Oil Corporation, Fairfax, Va.

[21] Appl. No.: 997,433

[22] Filed: Dec. 9, 1992

[51] Int. Cl.$^5$ .............................. C08F 4/10; C08F 4/64
[52] U.S. Cl. ...................... 502/115; 502/104; 502/116; 502/125; 502/153; 502/158
[58] Field of Search ............... 502/111, 115, 120, 125, 502/126, 153, 158

[56] References Cited

U.S. PATENT DOCUMENTS

| | | | |
|---|---|---|---|
| 2,905,645 | 9/1959 | Anderson et al. | 252/129 |
| 2,912,419 | 11/1959 | Peters et al. | 260/93.7 |
| 2,936,291 | 5/1960 | Peters et al. | 252/431 |
| 3,052,660 | 9/1962 | Osgan | 260/88.2 |
| 3,574,138 | 4/1971 | Ziegler et al. | 252/429 |
| 4,148,754 | 4/1979 | Strobel et al. | 252/429 |
| 4,296,223 | 10/1981 | Berger | 526/125 |
| 4,378,304 | 3/1983 | Dombro | 252/429 B |
| 4,458,058 | 7/1984 | Dombro | 526/129 |
| 4,478,988 | 10/1984 | Pullukat et al. | 526/128 |
| 4,481,301 | 11/1984 | Nowlin | 502/104 |
| 4,558,024 | 12/1985 | Best | 502/115 |
| 4,558,025 | 12/1985 | Best | 502/115 |
| 4,565,795 | 1/1986 | Short et al. | 502/120 |
| 4,579,835 | 4/1986 | Best | 502/120 |
| 4,668,650 | 5/1987 | Lo et al. | 502/111 |
| 4,727,049 | 2/1988 | Furuhashi et al. | 502/115 |
| 4,732,882 | 3/1988 | Allen et al. | 502/104 |
| 4,787,384 | 1/1974 | Stevens et al. | 260/94.9 |

Primary Examiner—Anthony McFarlane
Attorney, Agent, or Firm—Alexander J. McKillop; Malcolm D. Keen; Marina V. Schneller

[57] ABSTRACT

The catalyst of the invention is useful in preparing high density polymers of controlled molecular weight distribution.

A supported alpha-olefin polymerization catalyst composition of this invention is prepared in a multi-step process. In the first step, a mixture of a solid, porous carrier having reactive —OH groups and a non-polar solvent is contacted with at least one organomagnesium compound of the formula $$R_m Mg R'_n \qquad (I)$$

where R and R' are the same or different $C_4$–$C_{12}$ alkyl groups, m and n are each 0, 1 or 2, providing that m+n equals the valence of Mg. Subsequently, the mixture of the first step is contacted with 1-butanol. The amount of 1-butanol controls the molecular weight distribution of the The mixture is then contacted with at least one transition metal compound soluble in the non-polar solvent to form a precursor which is activated with a cocatalyst selected from the group consisting of diisobutyl aluminum hydride or triethylaluminum (TEAL) (sometimes referred to as an activator, and the words activator and cocatalyst may be used interchangeably herein.)

26 Claims, 1 Drawing Sheet

CATALYST COMPOSITION FOR POLYMERIZING ALPHA-OLEFIN

FIELD OF THE INVENTION

The present invention relates to a method for polymerizing or copolymerizing ethylene, a catalyst for such a polymerization method and a method for producing such a catalyst. In particular, the present invention relates to a catalyst, and a method for preparation thereof, which produces high density polymers of ethylene with controlled melt flow response and controlled molecular weight distribution. The invention is also directed to a highly productive polymerization process carried out with the catalyst of the invention. The products of catalysis are high density polyethylene useful for HIC (household and industrial container) or HDPE film applications.

BACKGROUND OF THE INVENTION

One of the measures of the molecular weight distribution of the resin is flow ratio (FR), which is the ratio of high load melt index (HLMI or $I_{21}$) to melt index ($I_5$) for a given resin. The melt flow ratio is believed to be an indication of the molecular weight distribution of the polymer, the higher the value, the broader the molecular weight distribution. Resins having relatively low FR values, e.g., of about less than 12, have relatively narrow molecular weight distribution.

The application of the ultimate product will dictate the actual molecular weight distribution of the polymer. For example, LLDPE resins having relatively low FR values produce films of better strength properties than resins with high FR values. By comparison, it has been discovered that in certain high density products used for blown film, high molecular weight and broad molecular weight distribution in the product leads to better processing in terms of bubble stability in high stalk extrusion and in stronger films Many catalyst systems exhibit a tendency to produce resins whose FR values, although initially low, increase with increased concentration of the catalyst activator, also known as a cocatalyst, such as various aluminum alkyls.

It is a significant aspect of the present invention to provide a catalyst composition capable of producing polymers and copolymers having controlled molecular weight distribution and high densities.

It is therefore a primary object of the present invention to provide a high activity catalyst for the polymerization of olefins yielding products of a relatively controllable molecular weight distribution which will depend on the specific composition of the catalyst and the specific cocatalyst used in polymerization.

It is an additional object of the present invention to provide a catalytic process for polymerizing alpha-olefins which yields high molecular weight high density polyethylene of a relatively broad molecular weight distribution at high productivity.

SUMMARY OF THE INVENTION

The catalyst of the invention is useful in preparing high density polymers of controlled molecular weight distribution.

A supported alpha-olefin polymerization catalyst composition of this invention is prepared in a multi-step process. In the first step, a mixture of a solid, porous carrier having reactive —OH groups and a non-polar solvent is contacted with at least one organomagnesium compound of the formula $$R_m Mg R'_n \qquad (I)$$

where R and R' are the same or different $C_4$–$C_{12}$ alkyl groups, m and n are each 0, 1 or 2, providing that m+n equals the valence of Mg. Subsequently, the mixture of the first step is contacted with 1-butanol. The amount of 1-butanol controls the molecular weight distribution of the polymer prepared with the catalyst. The mixture is then contacted with at least one transition metal compound soluble in the non-polar solvent to form a precursor which is activated with a cocatalyst selected from the group consisting of diisobutyl aluminum hydride (DIBH) or triethylaluminum (TEAL) (sometimes referred to as an activator, and the words activator and cocatalyst may be used interchangeably herein.)

DETAILED DESCRIPTION OF THE INVENTION

Figure 1:
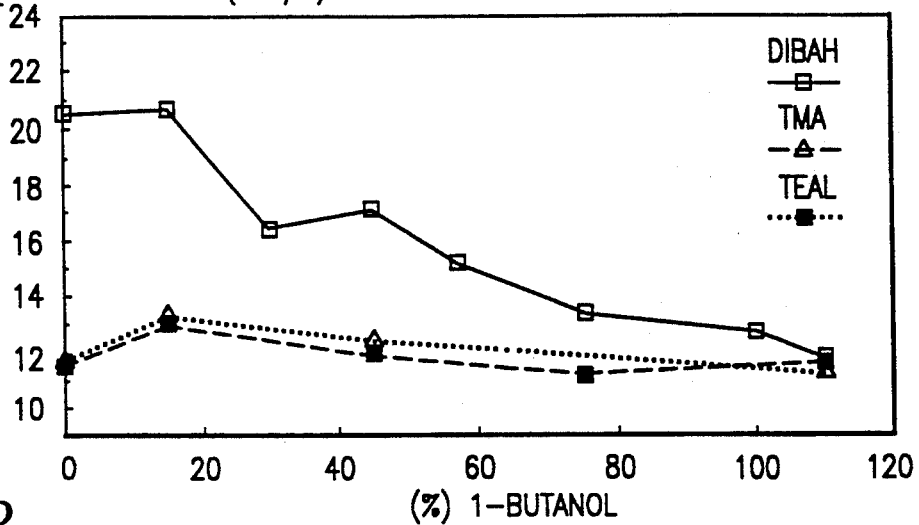
FIG. 1 is a graph of the plot of Flow Ratio ($I_{21}/I_5$) vs. % 1-butanol used in the catalyst preparation.

The polymers prepared in the presence of the catalyst composition of this invention are linear polyethylenes which are homopolymers of ethylene or copolymers of ethylene and higher alpha-olefins. The polymers exhibit relatively controllable values of flow ratio (FR), as compared to similar polymers prepared in the presence of previously-known catalyst compositions. It was suprisingly discovered that the treatment of the mixture or a slurry of the product of the second catalyst synthesis step in the non-polar solvent with 1-butanol substantially improves catalyst productivity (by about 20% to about 80%) and increases flow index response.

Catalysts produced according to the present invention are described below in terms of the manner in which they are made.

CATALYST SYNTHESIS

The carrier material is a solid, particulate, porous, preferably inorganic material. These carrier materials include inorganic materials, such as oxides of silicon and/or aluminum. The carrier material is used in the form of a dry powder having an average particle size of from about 1 micron to about 250 microns, preferably from about 10 microns to about 150 microns. The carrier material is also porous and has a surface area of at least about 3 square meters per gram ($m^2$/gm), and preferably at least about 50 $m^2$/gm. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 16 hours to achieve a surface hydroxyl group concentration of about 0.7 millimoles per gram (mmols/gm). The silica of the most preferred embodiment is a high surface area, amorphous silica (surface area=300 m$^2$/gm; pore volume of 1.65 cm$^3$/gm), and it is a material marketed under the tradenames of Davison 952 or Davison 955 by the Davison Chemical Division of W. R. Grace and Company. The silica is in the form of spherical particles, e.g., as obtained by a spray-drying process.

The carrier material is slurried in a non-polar solvent and the resulting slurry is contacted with at least one organomagnesium compound having the empirical formula (I). The slurry of the carrier material in the solvent is prepared by introducing the carrier into the solvent, preferably while stirring, and heating the mixture to about 25° to about 100° C., preferably to about 40° to about 60° C. The slurry is then contacted with the aforementioned organomagnesium compound, while the heating is continued at the aforementioned temperature.

The organomagnesium compound has the empirical formula (I) $R_m$ Mg $R'_n$ where $R_m$ and $R_n'$ are the same or different $C_4$-$C_{12}$ alkyl groups, preferably $C_4$-$C_{10}$ alkyl groups, more preferably $C_4$-$C_8$ normal alkyl groups, and most preferably both R and R' are n-butyl groups, and m and n are each 0, 1 or 2, providing that m+n is equal to the valence of Mg.

Suitable non-polar solvents are materials in which all of the reactants used herein, i.e., the organomagnesium compound, and the transition metal compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. In the most preferred embodiment, there is a reaction between the —OH groups on the carrier and the $R_m MgR'_n$ to produce either carrier-O-MgR'$_n$ (plus $R_m$H, an alkane, which is detected) or carrier-O-MgR$_m$ (plus $R_n'$H). The carrier drying temperature affects the number of sites on the carrier available for the organomagnesium compound—the higher the drying temperature the lower the number of sites. Thus, the exact amount of the organomagnesium compound needed to react with the hydroxyl groups will vary and must be determined on a case-by-case basis to assure that only so much of the organomagnesium composition is added to the solution as will react with the available hydroxyl groups. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the 1-butanol, added subsequently. thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected as a solution in the solvent.

For example, for the silica carrier heated at about 600° C., the amount of the organomagnesium compound added to the slurry is such that the molar ratio of Mg to the hydroxyl groups (OH) on the solid carrier ranges from 0.5 to 1.5. In a preferred embodiment, the Mg:OH ratio is 1:0. The organomagnesium compound dissolves in the non-polar solvent to form a solution from which the organomagnesium compound is deposited onto the carrier.

It is also possible to add such an amount of the organomagesium compound which is in excess of that which will be deposited onto the support, and then remove, e.g., by filtration and washing, any excess of the organomagnesium composition. However, this alternative is less desirable than the most preferred embodiment described above.

After the addition of the organomagnesium compound to the slurry is completed, the slurry is contacted with 1-butanol. The maximum amount of 1-butanol, used in this step, provides a 1-butanol/mg ratio of 1.1. The minimum amount of 1-butanol provides a 1-butanol:Mg ratio of about 0.10. In a preferred embodiment the 1-butanol:Mg ratio ranges from 0.2 to 0.8. The largest FR values for products resulting from catalysis in accordance with the invention, ranging from 20 to 17, correspond to ratios of 1-butanol to Mg on the carrier ranging from 0.10 to 0.40. Intermediate range FR values ranging from 16 to 14, correspond to ratios of 1-butanol to Mg on the carrier ranging from 0.41 to 0.70. Low range FR values, indicating narrow molecular weight distribution, for products resulting from catalysis in accordance with the invention, ranging from 13 to 11, correspond to ratios of 1-butanol to Mg on the carrier ranging from 0.71 to 1.10.

This synthesis step is conducted at about 25° to about 65° C., preferably at about 30° to about 55° C., and most preferably at about 30° to about 40° C. The amount of the 1-butanol used in this synthesis step is sufficient to control FR and melt index response. The 1-butanol reacts substantially stoichiometrically with the $R_m$Mg $R'_n$ compound where $R_m$ and $R_n'$ are defined above. Accordingly, the exact amounts of 1-butanol are dependent on the $R_m$Mg $R'_n$ loading on the carrier and the extent of $R_m$Mg $R'_n$ conversion required.

The amount of 1-butanol can be sufficient to convert all (100%) Mg-alkyl (e.g., butyl) groups to Mg-butoxy groups; in this embodiment, the amount of the 1-butanol added is such that substantially no excess thereof is present in the non-polar solvent after substantially all of the magnesium alkyl groups are converted to the magnesium alkoxy groups on the carrier to prevent the reaction of the 1-butanol with the transition metal compound outside of the carrier. Under this precursor synthesis regime, when all Mg-alkyl groups are converted to Mg-butoxy groups, the activated catalyst yields on polymerization a product exhibiting an FR of 12. The corresponding FI of the product exhibiting an FR of 12, is about 5.5. The amount of 1-butanol can be sufficient to convert 57% Mg-alkyl groups to Mg-butoxy groups. Under this precursor synthesis regime, when 57% Mg-alkyl groups are converted to Mg-butoxy groups, the activated catalyst yields on polymerization a product exhibiting an FR of 15. The corresponding FI of the product exhibiting an FR of 15 is about 3. The amount of 1-butanol can be sufficient to convert 30% Mg-alkyl groups to Mg-butoxy groups. Under this precursor synthesis regime, when 30% Mg-alkyl groups are converted to Mg-butoxy groups, the activated catalyst yields on polymerization a product exhibiting an FR of 17.7. The corresponding FI of the product exhibiting an FR of 17.7, is about 3.6. The amount of 1-butanol can be sufficient to convert 15% Mg-alkyl groups to Mg-butoxy groups. Under this precursor synthesis regime, when 15% Mg-alkyl groups are converted to Mg-butoxy groups, the activated catalyst yields on polymerization a product exhibiting an FR of 20. The corresponding FI of the product exhibiting an FR of 20, is about 3.0.

This data show that as the amount of 1-butanol is increased in the catalyst preparation procedure, flow index response of the catalyst increases and polymer molecular weight distribution (MWD) decreases. This effect being most pronounced with DIBAH as cocatalyst. The data show that if only 15% of the butyl groups is converted, MWD of the polymer is broader as evident from the higher FR and the FI response is doubled. However, if 30% and 57% of the Mg-R groups are converted to Mg-OR groups, data indicate that polymer FR decreases but the flow index response continues to increase. If the 1-butanol treatment is entirely omitted, the resulting precursor produces on activation a product which exhibits FR of greater than about 18. Accordingly, A catalyst formed with only 15% 1-butanol provides a relatively broad polymer MWD, yet increases the flow index response of the catalyst. Catalysts produced with between about 30–100% 1-butanol allow control of polymer MWD between the limits of a Flow Ratio (FR) of about 12–17, at a catalyst flow index response greater than that of the butanol unaltered catalyst precursor. Moreover, the catalyst precursor of the invention exhibit excellent die swell characteristics.

After the addition of 1-butanol is completed, the slurry is contacted with at least one transition metal compound soluble in the non-polar solvent. This synthesis step is conducted at about 25° to about 65° C., preferably at about 30° to about 55° C., and most preferably at about 30° to about 40° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. The amount of the transition metal compound utilized is such that the molar ratio of Mg to the transition metal is about 0.5 to about 2, preferably about 0.6 to about 1.0.

Suitable transition metal compounds used herein are compounds of metals of Groups IVA, VA, VIA or VIII of the Periodic Chart of the Elements, as published by the Fisher Scientific Company, Catalog No. 5-702-10, 1978, providing that such compounds are soluble in the non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride.

Mixtures of such transition metal compounds may also be used and generally no restrictions are imposed on the transition metal compounds which may be included. Any transition metal compound that may be used alone may also be used in conjunction with other transition metal compounds.

After the addition of the transition metal compound is completed, the non-polar solvent is slowly removed, e.g., by distillation or evaporation. It has been found that the temperature at which the non-polar solvent is removed from the synthesis mixture affects the productivity of the resulting catalyst composition. Lower solvent removal temperatures produce catalyst compositions which are substantially more active than those produced with higher solvent removal temperatures. For this reason, it is preferred to remove the non-polar solvent at about 40° to about 65° C., preferably at about 45° to about 55° C. and most preferably at about 55° C. by drying, distillation or evaporation or any other conventional means.

Figure 2:
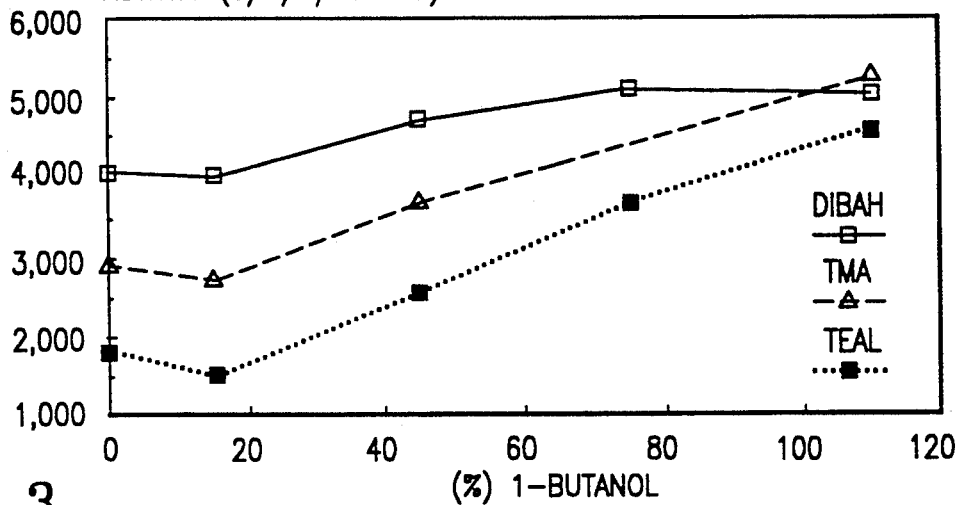
FIG. 2 is a graph of the plot of Activity vs. % 1-butanol used in the catalyst preparation.

The resulting free-flowing powder, referred to herein as a catalyst precursor, is combined with the activator. In accordance with the invention, the amount of the activator ranges from an Al/Ti ratio of 10–300. In accordance with the invention, the activator is selected from the group consisting of trimethylaluminum, triethylaluminum, and diisobutylaluminum hydride. The diisobutylaluminum hydride is preferred. It was found that the combination of the precursor of this invention with the diisobutylaluminum hydride (DIBA) activator produces an ethylene polymerization or copolymerization composition which exhibits relatively constant, activity showing a slight increase as more 1-butanol is added to the catalyst. with DIBAH as cocatalyst, polymer can be prepared with an FR which can be adjusted over the range of about 11–20 depending on the amount of 1-butanol used in the catalyst preparation. Cf. FIG. 2. With TEAL or TMA as cocatalyst, these catalysts provide polymer over a much narrower FR range of about 11–13. However, catalyst activity increases significantly as additional 1-butanol is added to the catalyst. However, with TEAL or TMA as cocatalyst activity increases significantly as additional 1-butanol is added to the catalyst. The catalyst in which a 10% excess of 1-butanol was added, exhibited comparable activity with each of the three cocatalysts, about 4,500 g/g/h/100 psi ethylene.

Figure 3:
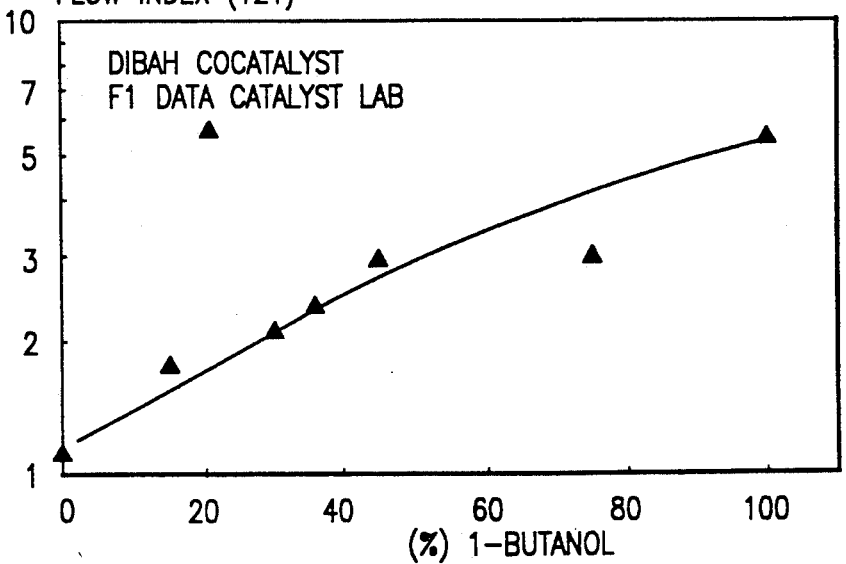
FIG. 3 is a graph of the plot of Flow Index vs. % 1-butanol used in the catalyst preparation.

FIG. 3 illustrates the increase in FI response of the catalysts with DIBAH as cocatalyst as the amount of 1-butanol used in the preparation increases.

Without wishing to be bound by any theory of operability, it is believed that the catalyst composition of this invention is produced by chemically impregnating the support with catalyst components sequentially added to the slurry of the carrier in the non-polar solvent. Therefore, all of the catalyst synthesis chemical ingredients must be soluble in the non-polar solvent used in the synthesis. The order of addition of the reagents may also be important since the catalyst synthesis procedure is predicated on the chemical reaction between the chemical ingredients sequentially added to the non-polar solvent (a liquid) and the solid carrier material or a catalyst intermediate supported by such a material (a solid). Thus, the reaction is a solid-liquid reaction. For example, the catalyst synthesis procedure must be conducted in such a manner as to avoid the reaction of two or more reagents in the non-polar solvent to form a reaction product insoluble in the non-polar solvent which would leave material deposited outside of the pores of the solid catalyst support. Such an insoluble reaction product would be incapable of reacting with the carrier or the catalyst intermediate and therefore would not be incorporated onto the solid support of the catalyst composition.

The catalyst precursors of the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of the non-polar solvent employed in the catalyst is also helpful in this regard.

The catalyst may be activated in situ by adding the activator and catalyst separately to the polymerization medium. It is also possible to combine the catalyst and the activator before the introduction thereof into the polymerization medium, e.g., for up to about 2 hours prior to the introduction thereof into the polymerization medium at a temperature of from about −40° to about 100° C.

POLYMERIZATION

Alpha-olefins are polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by measurable positive change in melt index ($I_2$) of the polymer produced.

The molecular weight distribution of the polymers prepared in the presence of the catalysts of the present invention, as expressed by the FR values, varies from about 11 to about 20, preferably about 14 to 18, an $I_{21}$ (Flow Index) of about 0.5 to about 50, preferably 1.0 to 40. HDPE products, produced with the catalysts of this invention, have a density of about 0.930 to about 0.960.

The catalysts prepared according to the present invention are highly active and may have an activity of at least about 1.0 to about 6.0 kilograms of polymer per gram of catalyst per 100 psi of ethylene in about 1 hour.

The linear polyethylene polymers prepared in accordance with the present invention are homopolymers of ethylene or copolymers of ethylene with one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl/1-pentene copolymers, ethylene/1-butene/1-hexene terpolymers, ethylene/propylene/1-hexene terpolymers and ethylene/propylene/1-butene terpolymers.

A particularly desirable method for producing linear polyethylene polymers according to the present invention is in a fluid bed reactor. Such a reactor and means for operating it are described by Levine et al, U.S. Pat. No. 4,011,382, Karol et al, U.S. Pat. No. 4,302,566 and by Nowlin et al, U.S. Pat. No. 4,481,301, the entire contents of all of which are incorporated herein by reference. The polymer produced in such a reactor contains the catalyst particles because the catalyst is not separated from the polymer.

In accordance with a preferred embodiment of the invention the polymers produced in accordance with the invention are high density products having densities ranging from 0.930 to 0.960 g/cc. In a preferred embodiment these high density products may be blended with a low molecular weight polymer or copolymer of ethylene of narrow molecular weight distribution.

Blending may be undertaken catalytically to produce bimodal ethylene polymer blends having a desirable combination of processability and mechanical properties are produced by a process including the steps of polymerizing gaseous monomeric compositions comprising a major proportion of ethylene in at least two gas phase, fluidized bed reactors operating in the tandem mode under the following conditions. In the first reactor, a gas comprising monomeric composition and, optionally, a small amount of hydrogen, is contacted under polymerization conditions with a catalyst of the present invention, at a hydrogen/ethylene molar ratio of no higher than about 0.3 and an ethylene partial pressure no higher than about 100 psia such as to produce a relatively high molecular weight (HMW) polymer powder wherein the polymer is deposited on the catalyst particles. The HMW polymer powder containing the catalyst is then transferred to a second reactor with, optionally, additional cocatalyst which may be the same or different from the cocatalyst utilized in the first reactor but with no additional transition metal catalyst component, together with a gaseous mixture comprising hydrogen and monomeric composition wherein additional polymerization is carried out at a hydrogen/ethylene molar ratio of at least about 0.6, the ratio being sufficiently high such that it is at least about 5.0 times that in the first reactor, and an ethylene partial pressure at least 1.7 times that in the first reactor, to produce a relatively low molecular weight (LMW) polymer much of which is deposited on and within the HMW polymer/catalyst particles from the first reactor, such that the fraction of HMW polymer in the bimodal polymer leaving the second reactor is at least about 0.35.

Moreover, such conditions provide for an inhibited level of productivity in the first reactor with a resulting increased level of productivity in the second reactor to produce a polymer blend having a favorable melt flow ratio (MFR, an indication of molecular weight distribution) and a high degree of homogeneity (indicated by low level of gels and low heterogeneity index) caused by a substantial degree of blending of HMW and LMW polymer in each final polymer particle inherently resulting from the process operation.

The polymer blend is capable of being processed without undue difficulty into films and containers for household industrial chemicals (HIC) having a superior combination of mechanical properties. One of those properties is die swell. High molecular weight high density polymers produced in the catalysis of the invention produce products which are characterized by swell as high as commercially available HIC products. The commercially available products are produced in slurry processes. The advantage of the die swell properties is the provision of "drop in" product which allows use of the polymeric product without material alteration of existing equipment for household and industrial container (HIC) production.

The gaseous monomer entering both reactors may consist wholly of ethylene or may comprise a preponderance of ethylene and a minor amount of a comonomer such as a 1-olefin containing 3 to about 10 carbon atoms. Comonomeric 1-olefins which may be employed are, for example, 1-butene, 1-pentene, 1-hexene, 4-methyl-1-pentene, 1-octene, 1-decene, and mixtures thereof. The comonomer may be present in the monomeric compositions entering either or both reactions.

In many cases, the monomer composition will not be the same in both reactors. For example, in making resin intended for high density film, it is preferred that the monomer entering the first reactor contain a minor amount of comonomer such as 1-hexene so that the HMW component of the product is a copolymer, whereas the monomer fed to the second reactor consists essentially of ethylene so that the LMW component of the product is substantially an ethylene homopolymer. When a comonomer is employed so as to obtain a desired copolymer in either or both reactors, the molar ratio of comonomer to ethylene may be in the range, for example, of about 0.005 to 0.7, preferably about 0.04 to 0.6.

Hydrogen may or may not be used to modulate the molecular weight of the HMW polymer made in the first reactor. Thus, hydrogen may be fed to the first reactor such that the molar ratio of hydrogen to ethylene ($H_2/C_2$ ratio) is, for example, up to about 0.3, preferably about 0.005 to 0.2. In the second reactor it is necessary to produce a LMW polymer with a low enough molecular weight and in sufficient quantity so as to produce a polymer resin which can be formed, with a minimum of processing difficulties, into end use products such as films and containers for household industrial chemicals having a superior combination of mechanical properties. For this purpose, hydrogen is fed to the second reactor with the ethylene containing monomer such that the hydrogen to ethylene mole ratio in the gas phase is at least about 0.6, preferably in the range of about 0.7 to 3.0 and most preferably in the range of about 0.8 to 2.0. Moreover, to provide a sufficient difference between the molecular weights of the polymers in the first and second reactor so as to obtain a resin product having a broad enough molecular weight distribution necessary for the desired levels of processability and mechanical properties, the hydrogen to ethylene mole ratios in the two reactors should be such that the ratio in the second reactor is at least about 5.0 times the ratio in the first reactor.

Utilizing the hydrogen to ethylene ratios set out previously to obtain the desired molecular weights of the HMW and LMW polymers produced in the first and second reactors, respectively, tends to result in relatively high polymer productivity in the first reactor and relatively low productivity in the second reactor. This tends to result in turn in a bimodal polymer product containing too little LMW polymer to maintain satisfactory processability. A significant part of this invention lies in the discovery that this effect can be largely overcome by employing ethylene partial pressures in the two reactors so as to reduce the polymer productivity in the first reactor and raise such productivity in the second reactor. For this purpose, the ethylene partial pressure employed in the first reactor is no higher than about 100 psia, for example in the range of about 15 to 100 psia, preferably in the range of about 20 to 80 psia and the ethylene partial pressure in the second reactor is, for example in the range of about 26 to 170 psia, preferably about 70 to 120 psia, with the ethylene partial pressures in any specific process being such that the ratio of ethylene partial pressure in the second to that in the first reactor is at least about 1.7, preferably about 1.7 to 7.0, and more preferably about 2.0 to 4.0.

If desired for any purpose, e.g., to control superficial gas velocity or to absorb heat of reaction, an inert gas such as nitrogen may also be present in one or both reactors in addition to the monomer and hydrogen. Thus the total pressure in both reactors may be in the range, for example, of about 100 to 600 psig, preferably about 200 to 350 psig.

The temperature of polymerization in the first reactor may be in the range, for example, of about 60° to 130° C., preferably about 60° to 90°, while the temperature in the second reactor may be in the range, for example, of about 80° to 130° C., preferably about 90° to 120° C. For the purpose of controlling molecular weight and productivity in both reactors, it is preferred that the temperature in the second reactor be at least about 10° C. higher, preferably about 30° to 60° C. higher than that in the first reactor.

The residence time of the catalyst in each reactor is controlled so that the productivity is suppressed in the first reactor and enhanced in the second reactor, consistent with the desired properties of the bimodal polymer product. Thus, the residence time may be, for example, about 0.5 to 6 hours, preferably about 1 to 3 hours in the first reactor, and, for example, about 1 to 12 hours, preferably about 2.5 to 5 hours in the second reactor, with the ratio of residence time in the second reactor to that in the first reactor being in the range, for example, of about 5 to 0.7, preferably about 2 to 1.

The superficial gas velocity through both reactors is sufficiently high to disperse effectively the heat of reaction so as to prevent the temperature from rising to levels which could partially melt the polymer and shut the reactor down, and high enough to maintain the integrity of the fluidized beds. Such gas velocity is in the range, for example, of about 40 to 120, preferably about 50 to 90 cm/sec.

The polymer produced in the first reactor has a flow index (FI or $I_{21}$, measured at 190° C. in accordance with ASTM D-1238, Condition F), for example, of about 0.05 to 5, preferably about 0.1 to 3 grams/10 min. and a density in the range, for example, of about 0.890 to 0.960, preferably about 0.910 to 0.940 grams/cc.

The polymer produced in the second reactor has a melt index (MI or $I_2$, measured at 190° C. in accordance with ASTM D-1238, Condition E) in the range, for example, of about 5 to 1000, preferably about 10 to 800 grams/10 min. and a density in the range, for example, of about 0.890 to 0.970, preferably about 0.930 to 0.970 grams/cc. These values are calculated based on a single reactor process model using steady state process data.

The final granular polymer has a weight fraction of HMW polymer of at least about 0.35, preferably in the range of about 0.35 to 0.75, more preferably about 0.45 to 0.65, a flow index in the range, for example, of about 3 to 200, preferably about 6 to 100 grams/10 min., a melt flow ratio (MFR, calculated as the ratio of flow index to melt index) in the range, for example, of about 60 to 250, preferably about 80 to 150, a density in the range, for example, of about 0.89 to 0.965, preferably about 0.910 to 0.960, an average particle size (APS) in the range, for example, of about 127 to 1270, preferably about 380 to 1100 microns, and a fines content (defined as particles which pass through a 120 mesh screen) of less than about 10 weight percent, preferably less than about 3 weight percent. With regard to fines content, it has been found that a very low amount of fines are produced in the first (HMW) reactor and that the percentage of fines changes very little across the second reactor.

The following examples further illustrate the essential features of the invention. However, it will be apparent to those skilled in the art that the specific reactants and reaction conditions used in the Examples do not limit the scope of the invention.

EXAMPLES

Examples 1-9

Eight new catalyst formulations were evaluated in which various amounts of 1-butanol were added to the catalyst.

The precursor is prepared by reacting Davison 955-600 silica with DBM, various amounts of 1-butanol followed by titanium tetrachloride[1]. Sufficient dibutyl-magnesium is used to completely react with the silica hydroxyl groups (955-600 silica contains ca. 0.72 mmol/g of hydroxyl groups), as shown below:

$$\text{-Si-OH} + \text{MgR}_2 \rightarrow \text{-Si-O-Mg-R} + \text{RH} \quad \text{(equation 1)}$$

(TYPE I)

1.74 mmol of DBM can be fixed to the silica surface in 955-600 silica. Hence, the interaction of DBM with the silica surface creates at least two types of magnesium groups. These are shown in equations 1 and 2 as Type (I) and Type (II) magnesiums, respectively. Catalysts that contain Type (II) magnesiums provide polymer with a somewhat narrower MWD, hence, the preferred CIS-1 catalysts for the tandem HIC program contain only Type (I) magnesiums[1c].

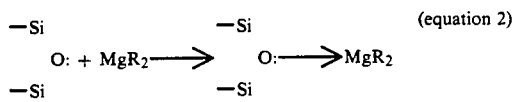

(equation 2)

(TYPE II)

When the precursor is prepared on Davison 955-600 silica with 0.72 mmol DBM/g silica only Type (I) magnesiums are present in the intermediate before the addition of the 1-butanol. Hence, addition of 1-butanol converts the Mg-R groups to -Mg-O-C₄H₉ groups (TYPE (III) magnesiums) as shown in equation 3.

$$\text{-Si-O-Mg-R} + \text{R'} = \text{C}_4\text{H}_9\text{-OH} \rightarrow \text{-Si-O-Mg-OR'} + \text{RH} \quad \text{(equation 3)}$$

(TYPE III)

Therefore, by controlling the amount of alcohol added to the silica/DBM intermediate, the formation of TYPE (III) magnesiums may be controlled.

The butanol was added after the DBM so that some of the Mg-butyl groups were converted to Mg-butoxy groups. The details of a typical preparation are given below:

5.00 grams of Davison 955-600 silica was transferred to a 100 ml pear-flask containing a magnetic stirring bar and under a slow nitrogen purge. About 60 ml of dry heptane was added to the flask and the slurry was stirred. The flask was placed into an oil bath at ca. 60° C. Next, 5.25 ml of 0,686 Molar DBM solution in heptane (3.60 mmol Mg) was added to the flask and the contents were stirred for 40 minutes. Then, 0.65 ml of a 0,843 Molar solution of 1-butanol (0.55 mmol) in heptane was added to the flask and stirring continued for 60 minutes.

There was sufficient alcohol to convert about 15% of the Mg-R groups to Mg-OR groups. This is referred to as CAT 1.15 catalyst.

Next, 5.9 ml of a 0.912 Molar solution of TiCl₄ in heptane was added to the slurry and stirring continued for another 50 minutes. Finally, the solvents were removed with a strong nitrogen purge to obtain a brown free-flowing powder. Analytical: Ti, 3.48 wt. %: Mg. 1.32 wt. %: Cl. 11.8 wt. %. Yield: 5.1 g.

Table I summarizes the catalysts which were prepared.

TABLE 1A

| CATALYST* | COCATALYST | fd Ti/Mg | fd (wt. %) Ti | fd (wt. %) Mg | ACTIVITY | I21 | FR |
|---|---|---|---|---|---|---|---|
| CAT-1.00 | DIBAH | 1.50 | 4.02 | 1.37 | 3945 | 1-12 | 17.3 |
| CAT-1.00 | DIBAH | 1.40 | 3.82 | 1.39 | 4807 | 1.03 | 18.0 |
| CAT-1.00 | DIBAH | 1.45 | 3.88,4.01 | 1.35,1.41 | 4064 | 1.39 | 18.4 |
| CAT-1.00 | DIBAH | 1.43 | 3.95 | 1.41 | 5475 | 1.13 | 18.8 |
| CAT-1.00 | DIBAH | 1.41 | 3.98 | 1.43 | 4350 | 0.97 | 18.7 |
| CAT-1.00 | DIBAH | 1.40 | 3.82 | 1.39 | 4320 | 3.90 | 21.6 |
| CAT-1.15 | DIBAH | 1.34 | 3.46 | 1.32 | 3886 | 3.0 | 20.0 |
| CAT-1.15 | TEAL | 1.34 | 3.46 | 1.32 | 1507 | 2.05 | 13.0 |
| CAT-1.15 | TMA | 1.34 | 3.46 | 1.32 | 2706 | 1.53 | 13.3 |
| CAT-1.36 | DIBAH | 1.26 | 3.34 | 1.32 | 4559 | 3.32 | 16.1 |
| CAT-1.30 | DIBAH | 1.32 | 3.36 | 1.29 | 4135 | 3.57 | 17.7 |
| CAT-1.57 | DIBAH | 1.25 | 3.20 | 1.30 | 4365 | 3.30 | 13.2 |
| CAT-1.45 | DIBAH | 1.30 | 3.30 | 1.29 | 4690 | 2.91 | 17.3 |
| CAT-1.45 | TEAL | 1.30 | 3.30 | 1.29 | 3532 | 2.81 | 11.9 |
| CAT-1.45 | TMA | 1.30 | 3.30 | 1.29 | 3660 | 1.74 | 12.4 |

TABLE 1A-continued

Summary of Experimental Data
MODIFIED CATALYSTS

| CATALYST* | COCATALYST | fd Ti/Mg | fd (wt. %) Ti | Mg | ACTIVITY | I21 | FR |
|---|---|---|---|---|---|---|---|
| CAT-1.75 | DIBAH | 1.26 | 3.19 | 1.26 | 5060 | 2.97 | 15.2 |
| CAT-1.75 | TEAL | 1.25 | 3.19 | 1.26 | 3645 | 3.42 | 11.2 |
| CAT-2.00 | DIBAH | 1.20 | 3.20 | 1.35 | 4871 | 5.47 | 12.5 |
| CAT-2.10 | DIBAH | | | | 4966 | 6.40 | 11.7 |
| CAT-2.10 | TEAL | | | | 4545 | 2.81 | 11.6 |
| CAT-2.10 | TMA | | | | 5190 | 3.40 | 11.2 |

*containing 0.72 mmole Mg/gram

TABLE (I)

| CATALYST TYPE | 1-BUTANOL (*) |
|---|---|
| CAT-1.00 | NONE |
| CAT-1.15 | 15% |
| CAT-1.30 | 30% |
| CAT-1.36 | 36% |
| CAT-1.45 | 45% |
| CAT-1.57 | 57 |
| CAT-1.75 | 75% |
| CAT-2.00 | 100% |
| CAT-2.10 | 110%(**) |

(*)represents the % of Mg-R groups converted to Mg-OR groups.
(**)an excess of alcohol was used so that ca. 10% of alcohol was probably coordinated to the Mg center as a Lewis base.

EXAMPLE 10

POLYMERIZATION DATA:

The catalysts summarized in Table (I) were evaluated with either TEAL, TMA or DIBAH as cocatalyst. As shown in Table 1A, the data are summarized in Table (II) and FIGS. 1 3.

The details of a typical polymerization are summarized below:

Experiment—CIS (1.15) catalyst

A 1.6-liter stainless steel autoclave, at about 52° C. was filled with 0.750 liters of heptane, 20 ml of 1-hexene and 4.0 mmol of DIBAH while kept under a slow nitrogen purge. After that, the stirring rate was set at 900 rpm, the internal temperature was increased to 78° C. and the reaction pressure was raised to 19.5 psi with hydrogen. Ethylene was introduced to maintain the total pressure of about 123 psi. Next, 0.0366 grams of catalyst was introduced into the reactor with ethylene over-pressure and the temperature was increased and held at 85° C. The polymerization reaction was continued for 60 minutes, then the ethylene supply was stopped and the reactor allowed to cool to room temperature. 150.7 grams of polyethylene were collected. It had an $I_{21}$ value of 2.35 with an FR of 20.7.

FIG. 1 shows the polymer Flow Ratio (FR = $I_{21}/I_5$) as a function of 1-butanol content in the catalyst with DIBAH, TMA or TEAL as cocatalyst. With 15% conversion of the Magnesium-alkyl groups as shown in equation 3, and DIBAH as cocatalyst, the polymer FR remains relatively high, then shows a decline as additional 1-butanol is added to the catalyst. The data with TEAL or TMA as cocatalyst indicate that FR increases at low 1-butanol levels and then decreases slightly as additional 1-butanol is added to the catalyst.

The activity of these catalysts with each of the three cocatalysts is shown in FIG. 2. The activity of these catalysts with DIBAH as cocatalyst is relatively constant, showing a slight increase as more 1-butanol is added to the catalyst. However, with TEAL or TMA as cocatalyst, catalyst activity increases significantly as additional 1-butanol is added to the catalyst. The catalyst in which a 10% excess of 1-butanol was added, exhibited comparable activity with each of the three cocatalysts, ca. 4,500 g/g/h/100 psi ethylene.

FIG. 3 illustrates the increase in FI response with DIBAH as cocatalyst of the catalysts as the amount of 1-butanol used in the preparation increases. Better catalyst FI response should improve catalyst productivity in the LMW reactor by allowing us to operate at higher ethylene partial pressures.

Based on this preliminary slurry data, we prepared HMW samples from the 15% and 30% 1-butanol modified catalysts. These HMW samples were blended with 53 wt. % of a pilot plant produced LMW component with an $I_2$ of 60 to examine annular die swell. The data is summarized in Table III.

TABLE (III)

Blend Annular Die Swell Data

| CATALYST | DIE SWELL |
|---|---|
| CAT-1 control (no 1-butanol) | 0.61 |
| CAT-1.15 | 0.65 |
| CAT-1.30 | 0.63 |

The die swell data indicate that 1-butanol modified catalysts of this invention exhibit slightly higher die swell relative to the control. Because these were slurry prepared HMW components, die swell is somewhat lower than pilot plant HMW components. Typically, LMW and HMW components prepared in the pilot plant provide blends with annular die swell of about 0.70.

Thus it is apparent that there has been provided, in accordance with the invention, a catalyst for polyermization, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for preparing a supported alpha-olefin polymerization catalyst composition which comprises the steps of:
   i) providing a slurry of a solid, porous carrier having silanol groups and a non-polar solvent to form a slurry of step (i), wherein the non-polar solvent is one in which an organomagnesium compound is soluble, ii) contacting the slurry of step (i) with at least one organomagnesium compound having the formula $$R_m Mg\ R'_n \qquad (I)$$

where R and R' are the same or different $C_4$–$C_{12}$ alkyl groups, m and n are each 0, 1 or 2, provided that m+n is equal to the valence of Mg and thereby producing at least one alkane selected from the group consisting of $R_m H$ and $R_n'H$, wherein $R_m$ and $R_n'$ are as defined above; where sufficient magnesium compound is used to react with the carrier hydroxyl groups (OH) at a Mg/OH ratio of 1.0, iii) adding to the slurry of step (ii) an amount of 1-butanol, wherein the amount of 1-butanol provides a 1-butanol:Mg molar ratio of 0.1 to 0.40, to control flow ratio of polymerization product and to maintain flow ratio in a range of 20 to 17, and thereby forming a slurry of step (iii);

iv) contacting the slurry of step (iii) with at least one titanium metal compound soluble in the non-polar solvent to provide a Ti:Mg ratio of 0.5 to 2.0, and v) combining the product of step (iv) with an activating amount of diisobutylaluminum hydride.

2. A process of claim 1 wherein R and R' are $C_4$–$C_{10}$ alkyl groups.

3. A process of claim 2 wherein R and R' are $C_4$–$C_8$ alkyl groups.

4. A process of claim 3 wherein R and R' are each butyl groups.

5. A process of claim 4 wherein the non-polar solvent is a hydrocarbon which is a liquid at ambient conditions.

6. A process of claim 5 wherein the titanium metal compound is titanium halide.

7. A process of claim 6 wherein the titanium halide is titanium tetrahalide.

8. A process of claim 7 wherein the titanium tetrahalide is $TiCl_4$.

9. A process of claim 8 wherein the amount of the $TiCl_4$ present in said step (iv) is such that the molar ratio of Mg to Ti is about 0.75 to about 1.50.

10. A process of claim 9 wherein the amount of the organomagnesium composition used in said step (ii) is such that the molar ratio of Mg:silanol groups is 1.0.

11. A process or claim 10 wherein the solid, porous carrier is silica which, prior to contact thereof with the solvent in said step (i), is heated at a temperature of at least about 200° C.

12. A process of claim 11 wherein the silica is heated at a temperature of about 600° C.

13. A process of claim 12 wherein the silica has, after the heating, surface hydroxyl group concentration of about 0.7 mmoles/gram, a surface area of 300 m²/ gram and a pore volume of 1.65 m³/ gram.

14. A supported alpha-olefin polymerization catalyst for producing high density product, with controlled flow ratio prepared by:

i) providing a slurry of a solid, porous carrier having silanol groups and a non-polar solvent to form a slurry of step (i), wherein the non-polar solvent is one in which an organomagnesium compound is soluble, ii) contacting the slurry of step (i) with at least one organomagnesium compound having the formula $$R_m Mg\ R'_n \qquad (I)$$

where R and R' are the same or different $C_4$–$C_{12}$ alkyl groups, m and n are each 0, 1 or 2, provided that m+n is equal to the valence of Mg and thereby producing at least one alkane selected from the group consisting of $R_m H$ and $R_n'H$, wherein $R_m$ and $R_n'$ are as defined above; where sufficient magnesium compound is used to react with the carrier hydroxyl groups (OH) at a Mg/OH ratio of 1.0.

iii) adding to the slurry of step (ii) an amount of 1-butanol, wherein the amount of 1-butanol provides a 1-butanol:Mg molar ratio of 0.1 to 0.40, to control flow ratio of polymerization product and to maintain flow ratio in a range of 20 to 17, and thereby forming a slurry of step (iii);

iv) contacting the slurry of step (iii) with at least one titanium metal compound soluble in the non-polar solvent to provide a Ti:Mg ratio of 0.5 to 2.0, and v) combining the product of step (iv) with an activating amount of diisobutylaluminum hydride.

15. A catalyst composition of claim 14 wherein R and R' are $C_4$–$C_{10}$ alkyl groups.

16. A catalyst composition of claim 15 wherein R and R' are $C_4$–$C_8$ alkyl groups.

17. A catalyst composition of claim 16 wherein R and R' are each butyl groups.

18. A catalyst composition of claim 17 wherein the non-polar solvent is a hydrocarbon which is a liquid at ambient conditions.

19. A catalyst composition of claim 18 wherein the transition metal compound is a compound of titanium.

20. A catalyst composition of claim 19 wherein the titanium metal compound is titanium halide.

21. A catalyst composition of claim 20 wherein the titanium halide is titanium tetrahalide.

22. A catalyst composition of claim 21 wherein the titanium tetrahalide is $TiCl_4$.

23. A catalyst composition of claim 22 wherein the amount of the $TiCl_4$ present in said step (iv) is such that the molar ratio of Mg to Ti is about 0.75 to about 1.5.

24. A catalyst composition of claim 23 wherein the solid, porous carrier is silica which, prior to contact thereof with the solvent in step (i), is heated at a temperature of at least about 600° C.

25. A catalyst composition of claim 24 wherein the silica is heated at a temperature of about 600° C.

26. A catalyst composition of claim 25 wherein the silica has, after the heating, surface hydroxyl groups concentration of about 0.7 mmoles/gr, a surface area of 300 m²/ gram and a pore volume of 1.65 m³/ gram.

* * * * *